United States Patent Office 2,698,333
Patented Dec. 28, 1954

2,698,333

TERTIARY-BUTYLPHENYL CHLOROSILANES

Quintin P. Cole, Pittsfield, Mass., and Joseph C. Caprino, Cohoes, N. Y., assignors to General Electric Company, a corporation of New York No Drawing. Application March 9, 1954,
Serial No. 415,169

5 Claims. (Cl. 260—448.2)

This invention is concerned with tertiary-butylphenyl chlorosilanes and in particular relates to tertiary-butylphenyl chlorosilanes having the general formula

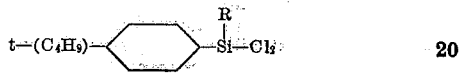

where R is a member selected from the class consisting of methyl and phenyl radicals.

In the production of organo-silicon compositions based upon the hydrolysis of organosilanes which contain silicon-bonded hydrolyzable groups, such as chlorine atoms, the hydrolyzates therefrom are condensed to give corresponding organopolysiloxanes whose stability depends greatly on the stability of the siloxane bonds, the silicon-carbon bonds, and on the organic radicals which are attached directly to silicon by carbon-silicon linkage.

Many different kinds of hydrocarbon radicals have been attached to silicon in the intermediate hydrolyzable silane which can be converted to the organopolysiloxane state. Generally for optimum stability, it has been found that the most useful organic radicals attached to silicon are the methyl and phenyl radicals. It has been found that as the carbon-carbon linkage attached to silicon increases in size, the stability of the organic radical becomes progressively lower. Thus, as one goes from the ethyl to the propyl radical, and from the propyl to, for instance, the n-butyl radical attached to silicon, one finds progressively that the heat resistance of the organic radicals becomes poorer and there is greater tendency toward cleavage of carbon-carbon bonds due to elevated temperatures. The same thing takes place in connection with aryl radicals attached to silicon by carbon-silicon linkages. Thus, although, for instance, the phenyl nucleus attached to silicon is quite stable, when one attaches aliphatic groupings to the phenyl nucleus, for instance, ethyl, propyl, n-butyl, etc., radicals, the stability suffers markedly at elevated temperatures so that the advantage of the phenyl radical attached directly to silicon is lost. The use of the phenyl radical has been found to be eminently desirable in making, for instance, silicone rubbers having good flexibility at low temperatures and in making silicone resins of improved flexibility within a wide range of temperatures.

The presence of long chain alkyl groups on phenyl nuclei has also been desirable in order to impart additional flexibility to organopolysiloxanes prepared from intermediates containing such radicals. However, as pointed out above, such further development and use of materials having these groupings has been materially hampered by the instability at elevated temperatures of the long chain aliphatic groups.

Unexpectedly we have discovered that we are able to prepare phenylchlorosilanes containing a plurality of linked carbon atoms attached to the phenyl nucleus, which are extremely stable by themselves, and which when hydrolyzed give organopolysiloxanes which themselves are extremely stable and for the most part are as stable as though the phenyl nucleus was unsubstituted with alkyl groups. The intermediate organochlorosilanes with which this invention is concerned are two particular compounds, namely, methyl para-tertiary-butylphenyldichlorosilane and phenyl para-tertiary-butylphenyldichlorosilane.

Various methods may be employed in preparing these compositions. The following examples, which are given by way of illustration and not by way of limitation, describe a preferred method for obtaining these particular compositions. All parts are by weight.

Example 1

A solution of 175 parts para-bromo-tertiary butyl benzene in about 120 parts diethyl ether was added slowly to 20 parts of magnesium in about 70 parts ether, and the resulting mixture in turn added slowly to 250 parts of methyltrichlorosilane dissolved in 175 parts of diethyl ether. After agitating the mixture for about one hour, the resulting reaction product was filtered and the liquid filtrate was fractionally distilled to obtain 72 parts of para-tertiary-butylphenyl methyldichlorosilane having the formula

boiling at about 92–96° C. (at 0.3 mm.). Analysis of this compound showed it to contain 27.1% chlorine and 11.8% silicon (theoretical: 28.7% chlorine and 11.3% silicon).

The para-tertiary-butylphenyl methyldichlorosilane obtained in Example 1 was refluxed with an equal amount, by weight, of acetic anhydride for about two hours and the reaction mixture fractionally distilled to obtain para-tertiary-butylphenyl methyldiacetoxysilane boiling at about 145° C. at 25 mm. This diacetoxy derivative which had the formula

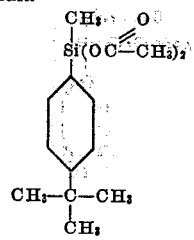

was hydrolyzed by stirring it with a large volume of water maintained at about −5° C. The amorphous powder which separated out was recrystallized from benzene to give colorless needless melting at about 155 to 156° C., and which was identified as 1,3-di-(p-tertiary-butylphenyl)-1,3-dimethyl-disiloxanediol-1,3, having the formula

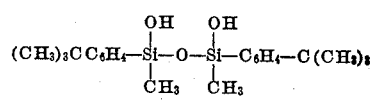

All the above derivatives were unexpectedly as heat-stable as similar derivatives in which the phenyl nucleus was unsubstituted with an alkyl group.

Example 2

An ether solution of 175 parts para-bromo-tertiary-butyl benzene in 120 parts diethyl ether was added slowly to 22.3 grams of magnesium in about 50 parts diethyl ether. The Grignard reagent which resulted was added dropwise to 466 parts of phenyltrichlorosilane dissolved in about 250 parts diethyl ether. Filtration of the mixture and distillation of the filtrate yielded 130 grams of phenyl para-tertiary-butylphenyldichlorosilane boiling at 158–9° C. at 2 mm. and had the following formula

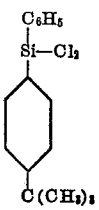

Analysis of this product showed it to contain 21.10% chlorine, 10.4% silicon, 62.5% carbon, and 6.14% hydrogen (theoretical: 22.9% chlorine, 9.07% silicon, 62.1% carbon, and 5.82% hydrogen).

The above phenyl para-tertiary-butylphenyldichlorosilane in an amount equal to 10 parts were stirred into 350 parts water at room temperature to give a paste which gradually solidified, and was finely ground to a white powder in the water. This powder was separated and recrystallized from a ligroin-benzene solution to a mass of colorless crystals melting at about 130°–135° C. Analysis of this compound showed it to be 1,3-di-(p-tertiary-butylphenyl) - 1,3 - diphenyldisiloxanediol - 1,3 as evidenced by the analysis which showed it to contain 11.6% silicon, 71.0% carbon and 7.81% hydrogen (theoretical: 10.6% silicon, 73.0% carbon and 7.2% hydrogen).

About 10 parts of the phenyl-tertiary-butylphenyldiol-1,3 prepared in Example 2 above was combined with 190 parts octamethylcyclotetrasiloxane, 0.064 part decamethyltrisiloxane and 0.08 part potassium hydroxide, and heated with stirring at 150° C. for about seven hours. Another portion of potassium hydroxide weighing about 0.08 part was added and the mixture again heated with stirring at 150° C. for two hours. The resultant high molecular weight polymer was compounded with 0.0165 part of benzoyl peroxide and 40 parts of silica aerogel, thereafter cured at about 150° C. for about thirty minutes and further heat-treated at 200° C. for twenty-four hours to give a product which had the following properties:

Elongation _____ per cent __ 250
Tensile strength _____ p. s. i __ 540
Tear strength _____ p. s. i __ 108

In addition to employing the claimed chlorosilanes herein described for making the dimeric diols, one may also employ these tertiary-butylphenylchlorosilanes in the preparation of silicone resins whereby increased flexibility of the silicone resins can be induced even though one employs a large molar concentration of methylchlorosilanes in making these organopolysiloxane resins. The presence of the para-tertiary-butyl group on the phenyl attached directly to silicon, improves the flexibility of the resins at normal temperatures, and of rubbers at very low temperatures without any apparent harm to the resin or rubber. This improvement in flexibility and low temperature properties is accompanied by no decrease in the high temperature stability of the organopolysiloxane rubbers or resins despite the presence of this large phenyl-bonded molecule, namely, the tertiary-butyl group containing a plurality of carbon-carbon linkages. It will also be apparent to those skilled in the art that the disiloxanediol compounds described above can be intercondensed with other organopolysiloxanes such as octaphenylcyclotetrasiloxane or mixtures of the diol with octaphenylcyclotetrasiloxane and octamethylcyclotetrasiloxane to make novel rubbers having improved low temperature characteristics. Such types of rubbers are eminently suitable as gasket materials in applications where the gasket will be subjected to high and low temperatures, for instance, in jet engines where silicone rubber gaskets have found such eminent use.

In addition the chlorosilanes prepared in accordance with the present invention may be reacted with Grignard reagents in order to introduce additional hydrocarbon groups into the silane as substitutes for halogen atoms. The stability of the tertiary-butyl radical on the phenyl radical attached directly to silicon is comparable to the stability of the methyl radical attached directly to silicon or the phenyl radical attached directly to silicon, and distinguishes the stability of the t-butylphenyl radical from all other known alkyl-substituted phenyl radicals containing two or more carbon atoms in the alkyl substituent.

What we claim as new and desire to secure by Letters Patent of the United States is:

1. A composition of matter selected from the class consisting of (1) 1,3-di-(p-tertiary-butylphenyl)-1,3-diphenyldisiloxanediol-1,3, (2) 1,3-di-(p - tertiary - butylphenyl)-1,3-dimethyldisiloxanediol-1,3, and (3) a tertiary-butylphenylchlorosilane having the formula

where R is a member selected from the class consisting of methyl and phenyl radicals.

2. 1,3-di-(para - tertiary - butylphenyl) - 1,3 - dimethyldisiloxanediol-1,3.

3. 1,3-di-(para-tertiary-butylphenyl) - 1,3 - diphenyldisiloxanediol-1,3.

4. Para-tertiary-butylphenyl methyldichlorosilane.

5. Para-tertiary-butylphenyl phenyldichlorosilane.

No references cited.